United States Patent
Muneda et al.

(10) Patent No.: US 12,337,578 B2
(45) Date of Patent: Jun. 24, 2025

(54) OUTER PACKING MATERIAL FOR VACUUM INSULATION MATERIAL, VACUUM INSULATION MATERIAL, AND ARTICLE PROVIDED WITH VACUUM INSULATION MATERIAL

(71) Applicant: DAI NIPPON PRINTING CO., LTD., Tokyo-to (JP)

(72) Inventors: Taku Muneda, Tokyo-to (JP); Masahiro Imai, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 722 days.

(21) Appl. No.: 17/622,282

(22) PCT Filed: Jun. 26, 2020

(86) PCT No.: PCT/JP2020/025372
§ 371 (c)(1),
(2) Date: May 5, 2022

(87) PCT Pub. No.: WO2020/262665
PCT Pub. Date: Dec. 30, 2020

(65) Prior Publication Data
US 2022/0339917 A1    Oct. 27, 2022

(30) Foreign Application Priority Data
Jun. 27, 2019    (JP) ................. 2019-120493

(51) Int. Cl.
*B32B 27/16*    (2006.01)
*B32B 7/027*    (2019.01)
*B32B 7/12*    (2006.01)
*B32B 9/00*    (2006.01)
*B32B 9/04*    (2006.01)
*B32B 27/08*    (2006.01)
*B32B 27/30*    (2006.01)
*B32B 27/32*    (2006.01)
*B65D 65/40*    (2006.01)

(52) U.S. Cl.
CPC ............. *B32B 27/16* (2013.01); *B32B 7/027* (2019.01); *B32B 7/12* (2013.01); *B32B 9/005* (2013.01); *B32B 9/045* (2013.01); *B32B 27/08* (2013.01); *B32B 27/306* (2013.01); *B32B 27/32* (2013.01); *B65D 65/40* (2013.01); *B32B 2250/02* (2013.01); *B32B 2250/04* (2013.01); *B32B 2250/44* (2013.01); *B32B 2255/26* (2013.01); *B32B 2307/7244* (2013.01); *B32B 2307/7246* (2013.01); *B32B 2307/732* (2013.01); *B32B 2553/00* (2013.01); *B65D 2565/387* (2013.01); *B65D 2565/388* (2013.01)

(58) Field of Classification Search
None
See application file for complete search history.

(56) References Cited

U.S. PATENT DOCUMENTS

2012/0148785 A1 *   6/2012   Hsu .................... B32B 27/36
                                                          428/335

FOREIGN PATENT DOCUMENTS

| CA | 2367996 A1 | 10/2000 |
| CN | 102555369 A | 7/2012 |
| CN | 108700244 A | 10/2018 |
| DE | 19915311 A1 | 10/2000 |
| EP | 3421860 A1 | 1/2019 |
| JP | 2003-262296 A | 9/2003 |
| JP | 2017-211082 A | 11/2017 |
| JP | 2018-59524 A | 4/2018 |
| JP | 2018-189188 A | 11/2018 |

* cited by examiner

*Primary Examiner* — Sheeba Ahmed
(74) *Attorney, Agent, or Firm* — Oliff PLC

(57) ABSTRACT

The present disclosure provides an outer packing material for vacuum insulation material comprising a thermally weldable film; a resin layer including at least one of an ethylene-vinyl alcohol copolymer and polyvinyl alcohol; and a gas barrier film including a resin base material, and an inorganic film placed on at least one main surface of the resin base material, wherein the resin layer is placed between the thermally weldable film and the gas barrier film, a water vapor permeability of the outer packing material for vacuum insulation material is 0.03 g/(m²·day) or less, and a metal layer is not placed in the outer packing material for vacuum insulation material.

8 Claims, 3 Drawing Sheets

OUTER PACKING MATERIAL FOR VACUUM INSULATION MATERIAL, VACUUM INSULATION MATERIAL, AND ARTICLE PROVIDED WITH VACUUM INSULATION MATERIAL

TECHNICAL FIELD

The present disclosure relates to an outer packing material for vacuum insulation material capable of forming a vacuum insulation material, a vacuum insulation material, and an article provided with a vacuum insulation material.

BACKGROUND ART

In recent years, vacuum insulation materials have been used for the purpose of energy conservation of articles. A vacuum insulation material is a material in which a core is arranged inside the bag body of an outer packing material, and inside the bag body is kept in a vacuum state of which pressure is lower than the atmospheric pressure; thus, heat convection inside is suppressed to exhibit excellent thermal insulation property. Incidentally, the outer packing material used for the vacuum insulation material is referred to as an outer packing material for vacuum insulation material, or simply an outer packing material while explained.

Outer packing materials for vacuum insulation material require properties such as gas barrier property for preventing gas such as oxygen and water vapor from permeating; and thermal weldability for enclosing and sealing a core material by bonding the end part when the core material is enclosed, in order to keep the vacuum state inside the vacuum insulation material for a long period of time. In order to satisfy these properties, in the outer packing material for vacuum insulation material, a structure including a gas barrier film and a thermally weldable film as constituting members is generally used.

A general outer packing material for vacuum insulation material uses a metal foil or a metal vapor deposition film as the gas barrier film. For example, Patent Document 1 discloses an outer packing material for vacuum insulation material using an aluminum foil.

CITATION LIST

Patent Document

Patent Document 1: Japanese Patent Application Laid-Open (JP-A) No. 2003-262296

SUMMARY

Technical Problem

Recently, for heat insulation boxes, for example, used for logistics, a vacuum insulation material capable of transmitting radiowave is required for the purpose of discrimination and traceability of contents. There was a problem that, although glass wool, fumed silica, and organic fiber, for example, used for the core material of the vacuum insulation material have radiowave transmittance, since the outer packing material for vacuum insulation material used for a conventional vacuum insulation material generally include a metal foil or a metal vapor deposition film, the radiowave is blocked so that it is not suitable for a use application requiring radio communication between inside and outside of a space.

The present disclosure has been made in view of the above circumstances, and a main object of the present disclosure is to provide an outer packing material for vacuum insulation material capable of transmitting radiowave and also capable of producing a vacuum insulation material capable of maintaining good thermal insulation property; and a vacuum insulation material, and an article provided with the vacuum insulation material using the same.

Solution to Problem

The present disclosure provides an n outer packing material for vacuum insulation material comprising a thermally weldable film; a resin layer including at least one of an ethylene-vinyl alcohol copolymer and polyvinyl alcohol; and a gas barrier film including a resin base material, and an inorganic film placed on at least one main surface of the resin base material, wherein the resin layer is placed between the thermally weldable film and the gas barrier film, a water vapor permeability of the outer packing material for vacuum insulation material is 0.03 g/(m²·day) or less, and a metal layer is not placed in the outer packing material for vacuum insulation material.

The present disclosure also provides an outer packing material for vacuum insulation material comprising a thermally weldable film; a resin layer including at least one of an ethylene-vinyl alcohol copolymer and polyvinyl alcohol; and a gas barrier film including a resin base material, and an inorganic film placed on at least one main surface of the resin base material, wherein the resin layer is placed between the thermally weldable film and the gas barrier film, the inorganic film of the gas barrier film placed on the resin layer, on an opposite side to the thermally weldable film, includes alumina, silica, or a mixture these, and a metal layer is not placed in the outer packing material for vacuum insulation material.

The present disclosure also provides an outer packing material for vacuum insulation material comprising a thermally weldable film; a resin layer including at least one of an ethylene-vinyl alcohol copolymer and polyvinyl alcohol; and a gas barrier film including a resin base material, and an inorganic film placed on at least one main surface of the resin base material, wherein the resin layer is placed between the thermally weldable film and two or more of the gas barrier films, and a metal layer is not placed in the outer packing material for vacuum insulation material.

The present disclosure also provides an outer packing material for vacuum insulation material comprising a thermally weldable film; a resin layer including at least one of an ethylene-vinyl alcohol copolymer and polyvinyl alcohol; and a gas barrier film including a resin base material, and an inorganic film placed on at least one main surface of the resin base material, wherein the resin layer is placed between the thermally weldable film and the gas barrier film, the gas barrier film placed on the resin layer, on an opposite side to the thermally weldable film, includes an overcoating layer placed on the inorganic film, on a main surface opposite to the resin base material, and a metal layer is not placed in the outer packing material for vacuum insulation material.

The present disclosure also provides a vacuum insulation material comprising a core material, and an outer packing material enclosing the core material; wherein the outer packing material is the outer packing material for vacuum insulation material described above.

The present disclosure also provides an article provided with vacuum insulation material comprising an article including a thermal insulation region, and a vacuum insulation material; wherein the vacuum insulation material includes a core material, and an outer packing material enclosing the core material; and the outer packing material is the outer packing material for vacuum insulation material described above.

Advantageous Effects

According to the present disclosure, an outer packing material for vacuum insulation material capable of transmitting radiowave and capable of producing a vacuum insulation material capable of maintaining good thermal insulation property, may be provided.

DESCRIPTION OF EMBODIMENTS

Figure 1:
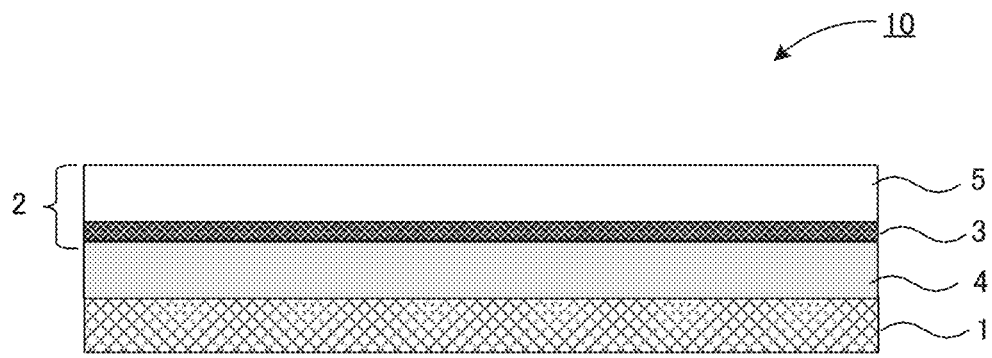
FIG. 1 is a schematic cross-sectional view illustrating an example of the first embodiment of the outer packing material for vacuum insulation material in the present disclosure.

The present disclosure includes an outer packing material for vacuum insulation material, a vacuum insulation material, and an article provided with a vacuum insulation material as its embodiments. Embodiments of the present disclosure are hereinafter explained with reference to, for example, drawings. However, the present disclosure is enforceable in a variety of different forms, and thus should not be taken as is limited to the contents described in the embodiments exemplified as below. Also, the drawings may show the features of the invention such as width, thickness, and shape of each part schematically comparing to the actual form in order to explain the invention more clearly in some cases; however, it is merely an example, and thus does not limit the interpretation of the present disclosure. Also, in the present description and each drawing, for the factor same as that described in the figure already explained, the same reference sign is indicated and the detail explanation thereof may be omitted. In addition, for the convenience of explanation, explanation may be made using the terms upward or downward in some cases, but the direction of up and down may be reversed.

Also, in the present descriptions, when some structure in some member or some region and the like is described to be "on (or below)" the other structure in other member or the other region and the like, unless otherwise stated, it is not just the case of being directly on (or directly below) the other structure, but the case of being upward (or downward) the other structure is also included; it means it also includes the case an additional structural element is included in between the upward (or downward) the other structure.

In order to impart radiowave transmittance to the outer packing material for vacuum insulation material, the present inventors have considered a configuration wherein a metal layer is not placed in the gas barrier film. However, they have found out that the oxygen permeability is increased and the gas barrier property is not sufficient.

Examples of the film wherein the barrier property is improved in a configuration not including the metal layer, may include a film including a metal oxide layer, and a barrier coating such as polyvinyl alcohol (PVA). However, even if a plurality of these films are combined, the property is not sufficiently improved, and there is a problem that the film is expensive.

As a barrier material, an ethylene-vinyl alcohol copolymer (EVOH) layer and a polyvinyl alcohol (PVA) layer having high barrier property against nitrogen and oxygen, those are abundant in the atmosphere, are useful. However, the present inventors have found out that these resins cannot exhibit the inherent oxygen barrier property when they absorb moisture, and thus the barrier property deteriorates.

As the result of intensive investigation to solve the above problems, the present inventors have found out that, instead of placing a metal layer in the outer packing material for vacuum insulation material, by placing a resin layer including an ethylene-vinyl alcohol copolymer (hereinafter, sometimes referred to as EVOH) or polyvinyl alcohol (hereinafter, sometimes referred to as PVA), and further, by placing a gas barrier film including an inorganic film on such the resin layer, on the opposite side to the side wherein a thermally weldable film is placed (in the direction opposite to the side of the core material, when the vacuum insulation material is formed), water vapor may be suppressed from penetrating into the resin layer and the deterioration of the oxygen barrier property may be suppressed. That is, it was found out that an outer packing material for vacuum insulation material capable of transmitting radiowave and capable of producing a vacuum insulation material capable of maintaining good thermal insulation property, may be provided. Further, such an outer packing material for vacuum insulation material is cheaper than an outer packing material for vacuum insulation material using a film including a conventional metal oxide layer and a barrier coating such as PVA. Examples of the outer packing material for vacuum insulation material in the present disclosure may include the first embodiment, the second embodiment, the third embodiment, and the fourth embodiment of the outer packing material for vacuum insulation material to be described below.

The outer packing material for vacuum insulation material, the vacuum insulation material, and the article provided with a vacuum insulation material in the present disclosure are hereinafter explained respectively.

A. Outer Packing Material for Vacuum Insulation Material

I. First Embodiment

The outer packing material for vacuum insulation material in the present embodiment is characterized by comprising a thermally weldable film; a resin layer (hereinafter, may be referred to as an oxygen barrier resin layer) including at least one of EVOH and PVA; and a gas barrier film including a resin base material, and an inorganic film placed on at least one main surface of the resin base material, wherein the oxygen barrier resin layer is placed between the thermally weldable film and the gas barrier film, a water vapor permeability of the outer packing material for vacuum insulation material is 0.03 g/(m$^2$·day) or less, and a metal layer is not placed in the outer packing material for vacuum insulation material.

FIG. 1 is a schematic cross-sectional view illustrating an example of the outer packing material for vacuum insulation material in the present embodiment. Outer packing material for vacuum insulation material 10 in the present embodiment comprises thermally weldable film 1, gas barrier film 2 including inorganic film 3, and oxygen barrier resin layer 4; and the gas barrier film 2 including inorganic film 3 is placed on the oxygen barrier resin layer 4, on the opposite side to the side wherein the thermally weldable film 1 is placed. That is, the oxygen barrier resin layer 4 is placed between the thermally weldable film 1 and the gas barrier film 2 including inorganic film 3. Also, the gas barrier film 2 includes the inorganic film 3 and resin base material 5 supporting the inorganic film 3.

A metal layer is not placed in the outer packing material for vacuum insulation material in the present embodiment. The metal layer in the present specification refers to a layer of metal having radiowave shielding property wherein the metal atoms constituting thereof are metallic bonded with each other. Examples of the metal layer may include a metal foil and a metal film of aluminum, nickel, stainless steel, iron, copper, and titanium.

Since a metal layer is not placed, the outer packing material for vacuum insulation material in the present embodiment is capable of transmitting radiowave. Further, the oxygen barrier property may be secured by including the oxygen barrier resin layer, and by placing the gas barrier film including an inorganic film, on the oxygen barrier resin layer, on an opposite side to the side wherein the thermally weldable film is placed, the deterioration of the oxygen barrier property of the oxygen barrier resin layer may be suppressed. Therefore, an outer packing material for vacuum insulation material is capable of transmitting radiowave, and capable of producing a vacuum insulation material capable of maintaining good thermal insulation property, may be provided.

Respective constitutions and properties of the outer packing material for vacuum insulation material in the present embodiment are hereinafter explained in detail.

1. Gas Barrier Film

In the outer packing material for vacuum insulation material in the present embodiment, one or more, preferably two or more gas barrier film including a resin base material, and an inorganic film placed on at least one main surface of the resin base material, is placed on the oxygen barrier resin layer, on an opposite side to a side wherein the thermally weldable film is placed. That is, the oxygen barrier resin layer is placed between one or more, preferably two or more gas barrier film including an inorganic film, and the thermally weldable film.

Incidentally, in the following descriptions, the gas barrier film placed on the opposite side to the side wherein the thermally weldable film is placed, with respect to the oxygen barrier resin layer, may be referred to as an outer gas barrier film.

In the present embodiment, although the gas barrier film may be placed between the thermally weldable film and the oxygen barrier resin layer, the gas barrier film is preferably not placed.

Incidentally, in the following descriptions, the gas barrier film placed between the oxygen barrier resin layer and the thermally weldable film may be referred to as an inner gas barrier film.

(a) Inorganic Film

The inorganic film included in the gas barrier film is a layer other than a metal layer such as a metal foil and a metal thin film, and examples thereof may include an inorganic compound film and a film including a M-O—P bond (here, M represents a metal atom, O represents an oxygen atom, and P represents a phosphorous atom), a film including a multivalent metal salt a polycarboxylic acid based polymer.

Examples of the inorganic compound constituting the inorganic compound film may include an oxide, an oxidized nitride, a nitride, an oxidized carbide, and an oxidized carbonized nitride of a non-metal element or a metal element such as silicon, aluminum, magnesium, calcium, potassium, tin, sodium, titanium, boron, yttrium, zirconium, cerium, and zinc. Specific examples thereof may include the following inorganic oxides: a silicon oxide such as $SiO_2$; an aluminum oxide such as $Al_2O_3$; a magnesium oxide; a titanium oxide; a tin oxide; a silicon zinc alloy oxide; an indium alloy oxide; a silicon nitride; an aluminum nitride; a titanium nitride; an oxidized nitridized silicon; and an oxidized silicon zinc. Particularly, an aluminum oxide (alumina) and a silicon oxide (silica) are preferable. The inorganic compound may be solely used and may be used by mixing the above materials in an arbitrary ratio.

In the present embodiment, the inorganic film is preferably the high barrier compound film described in the second embodiment described later, because of the high water vapor barrier property.

The inorganic compound film may be a vapor deposition film formed by a vapor deposition method, and may be a coating film formed by an applying method such as coating. When the inorganic compound film is the vapor deposition film, the film may be formed by a single time vapor deposition, and may be formed by a multiple times of vapor depositions. The inorganic compound film may be formed in a shape of film using conventionally known methods such as a coat method, a vapor deposition method, and a pressure joint method.

Among the above, from the viewpoint of making the adhesion with the resin base material higher, and exhibit higher gas barrier property, the vapor deposition film is preferable. One inorganic compound film may be a single film formed by one time vapor deposition, and may have a stacked structure formed by a multiple times of vapor depositions.

Examples of the film including a M-O—P bond (here, M represents a metal atom, O represents an oxygen atom, and P represents a phosphorous atom) may include a film including a reaction product of a metal oxide and a phosphorous compound.

Examples of the metal oxide may include an oxide of a metal of valence number of two or more; specifically, may include an oxide of a metal such as a metal belonging to the group 2 of the periodic table such as magnesium and calcium; a metal belonging to the group 12 of the periodic table such as zinc; a metal belonging to the group 13 of the periodic table such as aluminum; a metal belonging to the group 14 of the periodic table such as silicon; a transition metal such as titanium and zirconium. Among the above, aluminum oxide (alumina) is preferable.

Also, examples of the phosphorous compound may include a phosphoric acid, a polyphosphoric acid, a phosphorous acid, a phosphonic acid, and the derivatives of these. Among the above, the phosphoric acid is preferable. Specific examples of the reaction product of the metal oxide and the phosphorous compound may include those similar to the reaction products disclosed in JP-A No. 2011-226644.

The presence of the M-O—P bond may be confirmed by the presence of the maximum infrared ray absorption peak within the range of 1080 cm$^{-1}$ or more and 1130 cm or less in the infrared ray absorption spectrum (measured wavenumber range within 800 cm$^{-1}$ or more and 1400 cm$^{-1}$ or less). There are no particular limitations on the method for measuring the infrared ray absorption spectrum. For example, the following methods may be used: the measurement method using an attenuated total reflectance method (ATR method); a method wherein a sample is scraped from the inorganic film in the outer packing material for vacuum insulation material and the infrared ray absorption spectrum of the sample is measured by a KBr method; and a method wherein a collected sample is measured by a microscopic infrared spectroscopy.

There are no particular limitations on the thickness of the inorganic film, and is preferably within the range of 10 nm to 300 nm (in the present specification, the notation of A to B denotes a range including A and B). Making the thickness of the inorganic film within the above range, barrier property may be secured, and plasticity may also be sufficiently maintained so that a barrier breakage is not likely to occur.

(b) Resin Base Material

In the gas barrier film, a resin base material configured to support the inorganic film is placed on one main surface of the inorganic film. As the resin base material, for example, a film made of resin is preferably used. When the resin base material is a resin film, the resin film may be unstretched, and may be uniaxial stretched or biaxial stretched. The resin base material may or may not have transparency.

There are no particular limitations on a resin used for the resin base material. A variety of resins, for example, may be used, such as a polyolefin resin such as polyethylene and polypropylene; a polyester resin such as polyethylene terephthalate (PET), polyethylene naphthalate (PEN), and polybutylene terephthalate (PBT); a cyclic polyolefin resin; a polystyrene resin; an acrylonitrile-styrene copolymer (AS resin); an acrylonitrile-butadiene-styrene copolymer (ABS resin); a poly (meth) acrylic acid resin; a polycarbonate resin; an ethylene-vinyl ester copolymer resin and saponified product thereof; a polyamide resin such as a variety of nylon; a polyimide resin; a polyurethane resin; an acetal resin; and a cellulose resin. Among the above resins, PET, PBT, and nylon, for example, are used more preferably.

In the resin base material, various plastic compounding agent and additives may be included. Examples of the additive may include a lubricant, a crosslinking agent, an antioxidant, an ultraviolet absorber, a light stabilizer, a filler, a reinforcing agent, an anti-static agent, a pigment, and a modifier resin.

The resin base material may be subjected to a surface treatment. The reason therefore is to improve the adhesion with the inorganic film. Examples of the surface treatment may include a plasma treatment, an oxidization treatment disclosed in JP-A No. 2014-180837, a convexo-concaving treatment (surface roughing treatment), and an easily adhesive coating treatment.

There are no particular limitations on the thickness of the resin base material; for example, the thickness is in a range of 6 μm to 200 μm, and more preferably in a range of 9 μm to 100 μm. Also, the resin base material may be a single layer, and may be a layered body including a plurality of stacked resin layers. Respective resin layers of the layered body may be formed of different resins, and may be formed of the same resin.

(c) Overcoating Layer

Also, the gas barrier film in the outer packing material for vacuum insulation material in the present embodiment, particularly the outer gas barrier film preferably further includes an overcoating layer formed on one main surface of the inorganic film. Examples of the overcoating layer may include those similar to ones described in "A. Outer packing material for vacuum insulation material, IV. Fourth embodiment, 1. Gas barrier film, (b) Overcoating layer" below.

When the resin base material, the inorganic film, and the overcoating layer are included in the gas barrier film, they are usually included in the gas barrier film in this order. When the outer packing material for vacuum insulation material includes a plurality of gas barrier films, the inorganic film, the resin base material, and overcoating layer may be respectively the same, and may be different.

When the outer gas barrier film includes the resin base material and the inorganic film, the outer gas barrier film is preferably placed in the direction so that the inorganic film is on the oxygen barrier resin layer side described later, than the resin base material. Particularly, the inorganic film in the outer gas barrier film closest to the oxygen barrier resin layer is preferably placed to face the resin layer, not via the resin base material. Thereby, the influence, of moisture included inside the resin base material, on the resin layer may be reduced.

2. Oxygen Barrier Resin Layer

The outer packing material for vacuum insulation material in the present embodiment includes an oxygen barrier resin layer, that is, a resin layer including at least one of EVOH and PVA. EVOH and PVA are hydrophilic resins including a hydrophilic group, and exhibit high barrier property to oxygen.

There are no particular limitations on the oxygen barrier resin layer in the present embodiment as long as it includes at least one of EVOH and PVA, and is preferably mainly composed of at least one of EVOH and PVA. Here, "mainly composed of at least one of EVOH and PVA" means that at least one of EVOH and PVA is included to such an extent as to be able to exhibit the oxygen barrier property required for the oxygen barrier resin layer.

In the present embodiment, the content of at least one of EVOH and PVA in the oxygen barrier resin layer is preferably 50 mass, or more; above all, the content is preferably 90 mass % or more. A nuclear magnetic resonance (NMR) method may be used as a measuring method.

The gas barrier property of EVOH or PVA is likely to be lowered by water vapor. However, in the outer packing material for vacuum insulation material in the present embodiment, since the gas barrier film including the inorganic film is placed on the opposite direction (outer side) to the core material side direction (inner side) in the thickness direction when formed in to a vacuum insulation material, than the oxygen barrier resin layer, the deterioration of EVOH or PVA included in the oxygen barrier resin layer may be suppressed so that the barrier property, to oxygen, of the oxygen barrier resin layer may be maintained at high level. Therefore, the oxygen barrier resin layer in the present embodiment is able to maintain the function as a gas barrier film.

There are no particular limitations on the thickness of the oxygen barrier resin layer in the present embodiment, and may be 8 μm to 50 μm, preferably 10 μm to 30 μm, particularly preferably 12 μm to 15 μm.

Also, although the oxygen barrier resin layer alone has the function a gas barrier film, the inorganic film and the overcoating layer may be placed on the surface of the oxygen barrier resin layer.

The inorganic film and the overcoating layer placed on the surface of the oxygen barrier resin layer is a film other than a metal layer such as a metal foil and a metal film; and examples thereof may include those similar to ones described in "1. Gas barrier film, (a) Inorganic film" above or in "A. Outer packing material for vacuum insulation material, IV. Fourth embodiment, 1. Gas barrier film, (b) Overcoating layer" below.

3. Thermally Weldable Film

In the outer packing material for vacuum insulation material in the present embodiment, a thermally weldable layer is placed on one main surface side. Such thermally weldable film is a film that may be welded by heating thereof. The thermally weldable film is a member working as one surface in the thickness direction of the outer packing material for vacuum insulation material. The thermally weldable film contacts with a core material when a vacuum insulation material is produced using the outer packing material for vacuum insulation material in the present embodiment, and it is a member for bonding the edges of the outer packing materials for vacuum insulation material facing to each other when the core material is enclosed therein.

As the thermally weldable film, a resin film able to be melted and fused by heating, may be used. Examples thereof may include a polyolefin based resin film such as a polyethylene such as straight chain-short chain branched polyethylene (LLDPE), and unstretched polypropylene (CPP); a polyester based resin film such as polyethylene terephthalate (PET), polyethylene naphthalate (PEN), and polybutylene terephthalate (PBT), a polyvinyl acetate based resin film; a polyvinyl chloride based resin film; a poly(meth)acrylic resin film; and an urethane resin film. Also, EVOH or PVA may be used as the thermally weldable film. In this case, the thermally weldable film has the function as the oxygen barrier resin layer.

The thermally weldable film may include an additional material such as an anti-blocking agent, a lubricant, a flame retardant, and a filler material.

The thickness of the thermally weldable film may be in the thickness with which desired adhesiveness may be obtained when the outer packing materials for vacuum insulation material are bonded to each other; for example, it is within the range of 15 μm or more and 100 μm or less, preferably within the range of 25 μm or more and 90 μm or less, and more preferably within the range of 30 μm or more and 80 μm or less.

4. Properties

The water vapor permeability of the outer packing material for vacuum insulation material in the present embodiment is preferably 0.03 g/(m$^2$·day) or less, and above all, preferably 0.01 (m$^2$·day) or less. As described above, the outer packing material for vacuum insulation material in the present embodiment has excellent water vapor gas barrier property.

The water vapor permeability may be a value measured under the conditions of at a temperature of 40° C. and relative humidity difference of 90% RH in accordance with ISO 15106-5:2015 (differential pressure method).

The measurement of the water vapor permeability measurement may be carried out in the following steps: first, the outer packing material for vacuum insulation material cut out in a desired sample size is installed between an upper room and a lower room of the device so as the outermost surface layer positioned on the opposite to the thermally weldable film which is one of the outermost surface layers, among the facing outermost surfaces in the thickness direction (stacked direction), comes to high humidity side (water vapor supplying side), and the measurement is carried out to the permeation area of approximately 50 cm$^2$ (permeation region: circle having the diameter of 8 cm) under the conditions of temperature at 40° C. and relative humidity difference of 90% RH. As the water vapor permeability measurement device, for example, "DELTAPERM" from U.K. Technolox Ltd. may be used.

Further, although a metal layer is not placed in the outer packing material for vacuum insulation material in the present embodiment, the oxygen permeability may be, for example, 0.1 cc/(m$^2$·day·atm) or less, and above all, preferably 0.05 cc/(m$^2$·day·atm) or less, due to the oxygen barrier property of the oxygen barrier resin layer.

The oxygen permeability may be measured using an oxygen gas permeability measurement device with reference to JIS K7126-2:2006 (Plastic—film and sheet—gas permeability test method—Section 2: Isopiestic method, Annex A: Test method of oxygen gas permeability with electrolytic sensor method) under the conditions of temperature at 23° C. and humidity of 60% RH. As the oxygen permeability measurement device, for example, "OXTARAN" from U.S. MOCON may be used. The measurement may be carried out in the manner such that the outer packing material for vacuum insulation material cut out in a desired sample size is installed to the device so as the surface of the outermost layer on the opposite side to the thermally weldable film which is one of the outermost layers, among the layers working as two facing outermost surfaces in the thickness direction, comes to contact with oxygen gas, and the measurement is carried out to the permeation area of approximately 50 cm$^2$ (permeation region: circle having the diameter of 8 cm) under the conditions of carrier gas and test gas adjusted to temperature of 23° C. and humidity of 60% RH. On the occasion of the measurement, the carrier gas is supplied to the device at a flow rate of 10 cc/min for 60 minutes or more to purge. As the carrier gas, nitrogen gas including approximately 5% of hydrogen may be used. After purging, the measurement is carried out after securing 12 hours as the time, from letting the test gas flow to the device until reaching to the equilibrium state. As the test gas, the dry oxygen of at least 99.5% is used. The measurement of the oxygen permeability is carried out for at least 3 pieces of the sample, for one condition, and the average of these measured values is regarded as the value of oxygen permeability under that condition.

5. Arbitrary Constitutions

The outer packing material for vacuum insulation material in the present embodiment may include an adhesive layer, for example, between the gas barrier film and the gas barrier film, between the gas barrier film and the oxygen barrier resin layer, or between the oxygen barrier resin layer and the thermally weldable film. As a material of the adhesive layer, a conventionally known pressure-sensitive adhesive, a thermoplastic adhesive, a curable adhesive, for example, may be used.

The adhesive constituting the adhesive layer is usually, but is not limited to, a two-liquid curable type adhesive including a main agent and a curing agent. For example, it may be a one-liquid curable type adhesive obtained by mixing a main agent and a latent curing agent blocked by a known method so that it does not react with the main agent when they are mixed; and may be a one-liquid curable type adhesive obtained by mixing a curing agent and a latent main agent blocked by a known method so it does not to react with the curing agent when they are mixed.

Specifically, as an adhesive constituting the adhesive layer, an inorganic based adhesive including the followings, for example, may be used: epoxy based adhesives, polyvinyl acetate based adhesives, polyacrylic acid ester based adhesives, cyanoacrylate based adhesives, ethylene copolymer based adhesives, cellulose based adhesives, polyester based adhesives, polyamide based adhesives, polyimide based adhesives, amino resin based adhesives, phenol resin based adhesives, polyurethane based adhesives, reactive (meta) acrylic acid based adhesives, inorganic rubber based adhesives, silicone based adhesives, alkali metal silicate, and low melting point glass.

In particular, as the adhesive, polyacrylic acid ester based adhesives, and polyurethane based adhesives are preferable, and in particular, the adhesive is preferably a compound including an isocyanate group as a functional group, and specifically, polyurethane based adhesives is preferable.

The adhesive constituting the adhesive layer may include arbitrary material such as a curing accelerator, a catalyst, an antioxidant, a stabilizer, an ultraviolet absorber, a light stabilizer, and an antistatic agent.

The thickness of adhesive layer may be the thickness capable of exhibiting a desired adhesive force, and may be appropriately set according to the composition of the adhesive layer. Usually, it is preferable that the thickness is approximately 0.1 g/m$^2$ to 10 g/m$^2$ in a dry condition.

The adhesive layer may or may not have transparency, and it is preferable to have transparency, when transparency is required as an outer packing material for vacuum insulation material.

A sheet or a film formed with the adhesive described above may be used for the adhesive layer, and the adhesive layer may be formed by preparing a coating liquid obtained by mixing the adhesive described above into a desired solvent, directly applying the coating liquid onto one surface of the thermally weldable film or the gas barrier film, and drying and curing the coating liquid.

II. Second Embodiment

The outer packing material for vacuum insulation material in the present embodiment is characterized by comprising a thermally weldable film; an oxygen barrier resin layer; and a gas barrier film including a resin base material, and an inorganic film placed on at least one main surface of the resin base material, wherein the oxygen barrier resin layer is placed between the thermally weldable film and the gas barrier film, the inorganic film of the gas barrier film placed on the resin layer, on an opposite side to the thermally weldable film, includes alumina, silica, or a mixture of these, and a metal layer is not placed in the outer packing material for vacuum insulation material. Incidentally, an inorganic film including alumina, silica, or a mixture of these may be referred to as a high barrier compound film, hereinafter.

Figure 2:
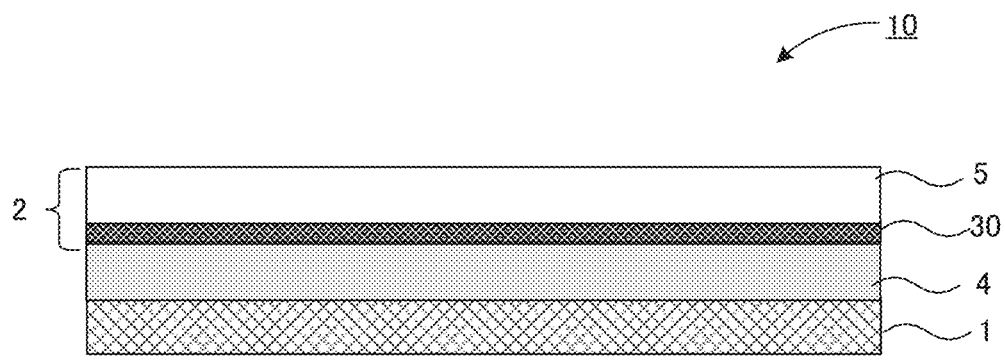
FIG. 2 is a schematic cross-sectional view illustrating an example of the second embodiment of the outer packing material for vacuum insulation material in the present disclosure.

FIG. 2 is a schematic cross-sectional view illustrating an example of the outer packing material for vacuum insulation material in the present embodiment. Outer packing material for vacuum insulation material 10 in the present embodiment comprises thermally weldable film 1, gas barrier film 2 including high barrier compound film 30, and oxygen barrier resin layer 4. The gas barrier film 2 including high barrier compound film 30 is placed on the oxygen barrier resin layer 4, on the opposite side to the side wherein the thermally weldable film 1 is placed. That is, the oxygen barrier resin layer 4 is placed between the thermally weldable film 1 and the gas barrier film 2 including high barrier compound film 30. The gas barrier film 2 includes the high barrier compound film 30 and resin base material 5 supporting the high barrier compound film 30.

Similar to the first embodiment, since a metal layer is not placed, the outer packing material for vacuum insulation material in the present embodiment is capable of transmitting radiowave. Further, similar to the first embodiment, by securing the oxygen barrier property by including the oxygen barrier resin layer, as well as placing the gas barrier film including a high barrier compound film, on the oxygen barrier resin layer, on an opposite surface side to the thermally weldable film, the high barrier compound film effectively suppresses the penetration of water vapor into the oxygen barrier resin layer, and the deterioration of the oxygen barrier property may be suppressed. Therefore, an outer packing material for vacuum insulation material capable of transmitting radiowave and capable of producing a vacuum insulation material capable of maintaining good thermal insulation property, may be provided.

1. Gas Barrier Film (a) Inorganic Film

In the present embodiment, the inorganic film included in at least one outer gas barrier film is a high barrier compound film, that is, an inorganic compound film including alumina, silica, or a mixture of these. Here, the high barrier compound film is not particularly limited as long as it includes the inorganic compound described above; the atomic number ratio of impurity other than aluminum, silicon, oxygen, and carbon is preferably 5 at % or less. The atomic number ratio may be measured by X-ray photoelectron spectroscopy (XPS). As the X-ray photoelectron spectroscopy, for example, Theta-Probe from Thermo Fisher Scientific K.K. may be used.

Also, as the outer gas barrier film, the outer packing material for vacuum insulation material in the present embodiment may include at least one gas barrier film including the high barrier compound film. Also, as the outer gas barrier film, it may include a gas barrier film including other inorganic film. Examples of the other inorganic film may include those similar to ones described in "A. Outer packing material for vacuum insulation material, I. First embodiment, 1. Gas barrier film, (a) Inorganic film" above, other than the high barrier compound film.

Also, the outer packing material for vacuum insulation material in the present embodiment preferably includes two or more gas barrier films including the high barrier compound film on the opposite side to a side wherein the thermally weldable film is placed, with respect to the oxygen barrier resin layer.

(b) Others

Similar to the gas barrier film in the first embodiment, the gas barrier film in the present embodiment may include the resin base material, and the overcoating layer. Particularly, the outer gas barrier film preferably further includes the overcoating layer. Examples thereof may include those similar to ones described in "A. Outer packing material for vacuum insulation material, I. First embodiment, 1. Gas barrier film, (b) Resin base material" above, and "A. Outer packing material for vacuum insulation material, IV. Fourth embodiment, 1. Gas barrier film, (b) Overcoating layer" below.

When the resin base material, the inorganic film, and the overcoating layer are included in the gas barrier film, they are usually included in the gas barrier film in this order. When the outer packing material for vacuum insulation material includes a plurality of gas barrier films, the inorganic film, the resin base material, and overcoating layer may be respectively the same, and may be different.

When the outer gas barrier film includes the resin base material and the high barrier compound film, the outer gas barrier film is preferably placed in the direction so that the high barrier compound film is on the oxygen barrier resin layer side described later, than the resin base material. Particularly, the high barrier compound film in the outer gas barrier film closest to the oxygen barrier resin layer is preferably placed to face the oxygen barrier resin layer, not via the resin base material. Thereby, the influence, of moisture included inside the resin base material, on the oxygen barrier resin layer may be reduced.

2. Oxygen Barrier Resin Layer

The outer packing material for vacuum insulation material in the present embodiment includes an oxygen barrier resin layer. The EVOH and PVA included in the oxygen barrier resin layer are hydrophilic resins including a hydrophilic group, and exhibit high barrier property to oxygen.

Examples of such oxygen barrier resin layer may include those similar to ones described in "A. Outer packing material for vacuum insulation material, I. First embodiment, 2. Oxygen barrier resin layer" above.

3. Thermally Weldable Film

The outer packing material for vacuum insulation material in the present embodiment includes the thermally weldable layer on one main surface side. Examples of the thermally weldable film may include those similar to ones described in "A. Outer packing material for vacuum insulation material, I. First embodiment, 3. Thermally weldable film".

4. Arbitrary Constitutions

Similar to the outer packing material for vacuum insulation material in the first embodiment, the outer packing material for vacuum insulation material in the present embodiment may include an adhesive layer. Examples of these may include those similar to ones described in "A. Outer packing material for vacuum insulation material, I. First embodiment, 5. Arbitrary constitutions".

5. Properties

The outer packing material for vacuum insulation material in the present embodiment has an excellent gas barrier property. The gas barrier property means an oxygen barrier property specified by an oxygen permeability, and a water vapor barrier property specified by a water vapor permeability.

Specifically, it may be similar to the gas barrier property similar to one described in "A. Outer packing material for vacuum insulation material, I. First embodiment, 4. Properties" above.

Particularly, the water vapor permeability may be 0.03 g/(m²·day) or less, and above all, may be 0.01 (m²·day) or less.

III. Third Embodiment

The outer packing material for vacuum insulation material in the present embodiment is characterized by comprising a thermally weldable film, an oxygen barrier resin layer, and a gas barrier film including a resin base material, and an inorganic film placed on at least one main surface of the resin base material, wherein the oxygen barrier resin layer is placed between the thermally weldable film and two or more of the gas barrier films, and a metal layer is not placed in the outer packing material for vacuum insulation material.

Figure 3:
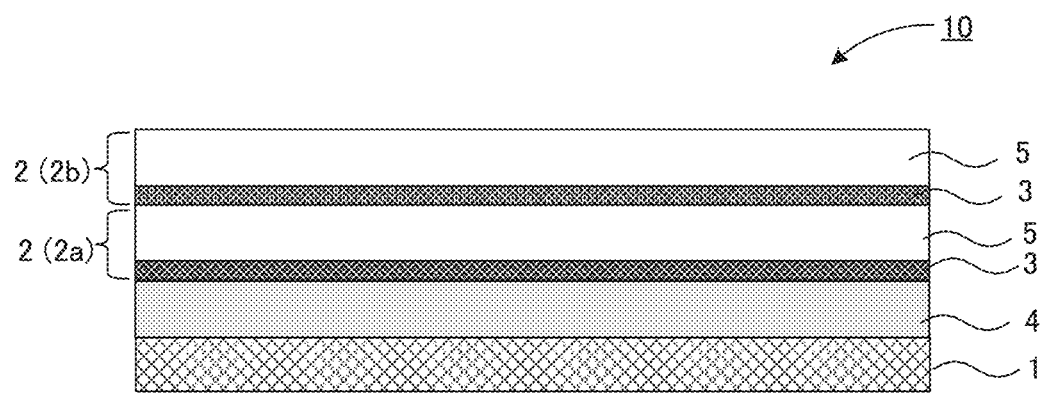
FIG. 3 is a schematic cross-sectional view illustrating an example of the third embodiment of the outer packing material for vacuum insulation material in the present disclosure.

FIG. 3 is a schematic cross-sectional view illustrating an example of the outer packing material for vacuum insulation material in the present embodiment. Outer packing material for vacuum insulation material 10 in the present embodiment comprises thermally weldable film 1, and two or more gas barrier films 2a, 2b including inorganic film 3. It further comprises oxygen barrier resin layer 4, and the two gas barrier films 2a, 2b are placed on the oxygen barrier resin layer 4, on the opposite side to the side wherein the thermally weldable film 1 is placed. Also, the gas barrier films 2a and 2b respectively include the inorganic film 3 and the resin base material 5 supporting the inorganic film 3.

Similar to the first embodiment and second embodiment, since a metal layer is not placed, the outer packing material for vacuum insulation material in the present embodiment is capable of transmitting radiowave. Further, the deterioration of the oxygen barrier property may be suppressed by securing the oxygen barrier property by including the oxygen barrier resin layer, as well as placing two or more gas barrier films including the inorganic film on the oxygen barrier resin layer, on an opposite surface side to the thermally weldable film. Therefore, an outer packing material for vacuum insulation material capable of transmitting radiowave and capable of producing a vacuum insulation material capable of maintaining good thermal insulation property, may be provided.

1. Gas Barrier Film

The outer packing material for vacuum insulation material in the present embodiment includes two or more gas barrier films including the inorganic film, and the oxygen barrier resin layer is placed between two or more gas barrier films including the inorganic film, and the thermally weldable film.

Incidentally, although a gas barrier film including the inorganic film may be placed between the thermally weldable film and the oxygen barrier resin layer, the gas barrier film including the inorganic film is preferably not placed.

(a) Inorganic Film

Examples of the inorganic film may include those similar to ones described in "A. Outer packing material for vacuum insulation material, I. First embodiment, 1. Gas barrier film, (a) Inorganic film" above.

Particularly, the inorganic film in the two or more outer gas barrier film is preferably the high barrier compound film described above.

(b) Others

Similar to the gas barrier film in the first embodiment, the gas barrier film in the present embodiment may include the resin base material and the overcoating layer. Particularly, the outer gas barrier film preferably further includes the overcoating layer. Examples of these may include those similar to ones described in "A. Outer packing material for vacuum insulation material, I. First embodiment, 1. Gas barrier film, (b) Resin base material" above and "A. Outer packing material for vacuum insulation material, IV. Fourth embodiment, 1. Gas barrier film, (b) Overcoating layer" below.

In a plurality of gas barrier films included in the outer packing material for vacuum insulation material, the inorganic film, the resin base material, and overcoating layer may be respectively the same, and may be different.

When the resin base material, the inorganic film, and the overcoating layer are included in the gas barrier film, they are usually included in the gas barrier film in this order.

When the outer gas barrier film includes the resin base material and the inorganic film, the outer gas barrier film is preferably placed in the direction so that the inorganic film is on the oxygen barrier resin layer side described later, than the resin base material. Particularly, the inorganic film in the outer gas barrier film closest to the oxygen barrier resin layer is preferably placed to face the oxygen barrier resin layer, not via the resin base material.

2. Oxygen Barrier Resin Layer

The outer packing material for vacuum insulation material in the present embodiment includes an oxygen barrier resin layer. The EVOH and PVA included in the oxygen barrier resin layer are hydrophilic resins including a hydrophilic group, and exhibit high barrier property to oxygen.

Examples of the oxygen barrier resin layer in the present embodiment may include those similar to ones described in "A. Outer packing material for vacuum insulation material, I. First embodiment, 2. Oxygen barrier resin layer" above.

3. Thermally Weldable Film

The outer packing material for vacuum insulation material in the present embodiment includes the thermally weldable layer on one main surface side. Examples of the thermally weldable film may include those similar to ones described in "A. Outer packing material for vacuum insulation material, I. First embodiment, 3. Thermally weldable film".

4. Arbitrary Constitutions

Similar to the outer packing material for vacuum insulation material in the first embodiment, the outer packing material for vacuum insulation material in the present embodiment may include an adhesive layer. Examples of these may include those similar to ones described in "A. Outer packing material for vacuum insulation material, I. First embodiment, 5. Arbitrary constitutions".

5. Properties

The outer packing material for vacuum insulation material in the present embodiment has an excellent gas barrier property. The gas barrier property means an oxygen barrier property specified by an oxygen permeability, and a water vapor barrier property specified by a water vapor permeability.

Specifically, it may be similar to the gas barrier property similar to one described in "I. First embodiment, A. Outer packing material for vacuum insulation material, 4. Properties" above.

Particularly, the water vapor permeability may be 0.03 g/(m²·day) or less, and above all, may be 0.01 (m²·day) or less.

IV. Fourth Embodiment

The outer packing material for vacuum insulation material in the present embodiment is characterized by comprising a thermally weldable film; an oxygen barrier resin layer; and a gas barrier film including a resin base material, and an inorganic film placed on at least one main surface of the resin base material, wherein the oxygen barrier resin layer is placed between the thermally weldable film and the gas barrier film, the gas barrier film placed on the oxygen barrier resin layer, on an opposite side to the thermally weldable film, includes an overcoating layer placed on the inorganic film, on a main surface opposite to the resin base material, and a metal layer is not placed in the outer packing material for vacuum insulation material.

Figure 4:
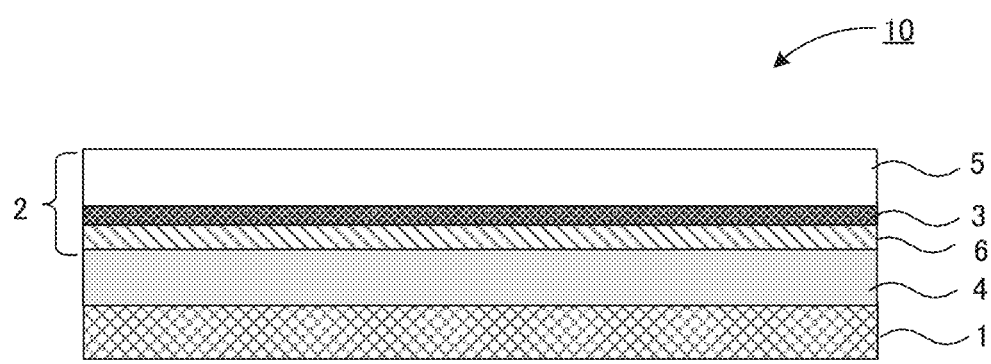
FIG. 4 is a schematic cross-sectional view illustrating an example of the fourth embodiment of the outer packing material for vacuum insulation material in the present disclosure.

FIG. 4 is a schematic cross-sectional view illustrating an example of the outer packing material for vacuum insulation material in the present embodiment. Outer packing material for vacuum insulation material 10 in the present embodiment comprises thermally weldable film 1, and gas barrier film 2 including inorganic film 3. Further, it comprises oxygen barrier resin layer 4, and the gas barrier film 2 is placed on the oxygen barrier resin layer 4, on the opposite side to a side wherein the thermally weldable film 1 is placed. The gas barrier film 2 is characterized by the configuration wherein resin base material 5, the inorganic film 3, and the overcoating layer 6 are stacked in this order. Also, in the example illustrated in FIG. 4, the gas barrier film 2 is placed in a direction so that the overcoating layer 6 faces the oxygen barrier resin layer 4.

Similar to the first embodiment, second embodiment, and third embodiment, since a metal layer is not placed, the outer packing material for vacuum insulation material in the present embodiment is capable of transmitting radiowave. Further, the deterioration of the oxygen barrier property may be suppressed by securing the oxygen barrier property by including the oxygen barrier resin layer, as well as placing the gas barrier film including an inorganic film and an overcoating layer, on the oxygen barrier resin layer, on an opposite surface side to the thermally weldable film. Therefore, an outer packing material for vacuum insulation material is capable of transmitting radiowave and capable of producing a vacuum insulation material capable of maintaining good thermal insulation property, may be provided.

1. Gas Barrier Film

In the outer packing material for vacuum insulation material in the present embodiment, the oxygen barrier resin layer is placed between one or more gas barrier film including the inorganic film and the overcoating layer, and the thermally weldable film.

Also, as the outer gas barrier film, the outer packing material for vacuum insulation material in the present embodiment may include one or more, preferably two or more gas barrier film including the inorganic film and the overcoating layer. Also, as the outer gas barrier film, it may include a gas barrier film not including the overcoating layer.

Although a gas barrier film including the inorganic film may be placed between the thermally weldable film and the oxygen barrier resin layer, the gas barrier film including the inorganic film is preferably not placed.

(a) Inorganic Film

Examples of the inorganic film may include those similar to ones described in "A. Outer packing material for vacuum insulation material, I. First embodiment, 1. Gas barrier film, (a) Inorganic film" above.

Particularly, the inorganic film in the outer gas barrier film is preferably the high barrier compound described above.

(b) Overcoating Layer

In the present embodiment, at least one or more of an outer gas barrier film further includes an overcoating layer formed on one main surface of the inorganic film. The overcoating layer is formed on the inorganic film, on a surface opposite to the resin base material, and material generally used as a barrier coating agent or an over coating agent may be used. Although the over coating may be one including an organic material only and not including an inorganic material, in particular, the over coating preferably includes a mixture of an inorganic material and an organic material. This is because the water vapor barrier property is high, compared to one not including an inorganic material. Examples of the inorganic material may include an inorganic filler, and an alkoxide component included in a sol-gel compound. The overcoating layer is hereinafter explained, separating thereof into a non-filler-containing overcoating layer including no filler, and a filler-containing overcoating layer including the filler.

Materials included in the non-filler-containing overcoating layer is not particularly limited as long as it does not include an inorganic filler, and material generally used as a barrier coating agent or an overcoating agent may be used. Examples of the material may include a sol-gel compound.

The sol-gel compound is high in an adhesive strength at an interface, and treatments in the film formation may be carried out at relatively low temperature, so that the deterioration by heat of the resin base material, for example, may be suppressed.

The overcoating layer including the sol-gel compound may be formed, for example, by a raw material liquid containing at least one kind or more of alkoxide represented by a general formula $R^1{}_nM(OR^2)_m$ (provided that in the formula, $R^1$ and $R^2$ each represents an organic group having carbon number of 1 or more and 8 or less, "M" represents a metal atom, "n" represents an integer of 0 or more, "m" represents an integer of 1 or more, and "n+m" represents the valence of "M") and a water-soluble polymer, and obtained by further polycondensation thereof by a sol-gel method. Examples of the metal atom "M" of the alkoxide represented by the general formula above may include silicon, zirconium, titanium, and aluminum. Among the above, silicon is preferable. As an alkoxide including silicon, tetraethyl orthosilicate (TEOS) is preferable. Also, examples of the water-soluble polymer may include a polyvinyl alcohol-based resin, an ethylene-vinyl alcohol copolymer, an acryl acid based resin, natural polymer based methyl cellulose, carboxymethyl cellulose, cellulose nanofiber, and polysaccharide. Among the above, the polyvinyl alcohol based resin is preferable.

Among the above, the sol-gel compound is preferably a polycondensation product of the tetraethyl orthosilicate (TEOS) and the polyvinyl alcohol based resin. The polycondensation product of the tetraethyl orthosilicate (TEOS) and the polyvinyl alcohol based resin may be similar to those disclosed in, for example, Japanese Patent No. 5568897.

The filler-containing overcoating layer includes an inorganic filler, and the thickness is in a range of 50 nm or more and 500 nm or less. The filler-containing overcoating layer is provided in directly contact with the surface opposite to the resin base material of the inorganic film. When the inorganic films are respectively placed on both surfaces of the resin base material, the filler-containing overcoating layer may be placed on at least one inorganic film, and may be placed respectively on the both inorganic films.

The thickness of the filler-containing overcoating layer is in a range of 50 nm or more and 500 nm or less. In detail, the thickness of the filler-containing overcoating layer may be 50 nm or more, among the above, may be 100 nm or more, further, may be 130 nm or more, and particularly, may be 150 nm or more. Also, the thickness of the filler-containing overcoating layer may be 500 nm or less, among the above, may be 480 nm or less, and particularly, may be 450 nm or less. By setting the thickness of the filler-containing overcoating layer within the range described above, high barrier property may be secured as well as generation of a defect such as a crack in the filler-containing overcoating layer may be prevented.

The thickness of the filler-containing overcoating layer may be measured by a cross-sectional SEM observation, and the average value may be the average value obtained by measuring five points including uneven parts (thickest part and thinnest part) in the SEM image for each filler-containing overcoating layer.

The inorganic filler may have a shape capable of filling defects such as cracks generated in the inorganic film. Examples of the shape of the inorganic filler may include the form of a layer, a plate, a scale, a polyhedral, a needle, a column, a sphere, a spindle, and a mass. A plurality of kinds of inorganic fillers having the above shapes may be used in combination. Among these, it is preferably in the form of a layer, a plate, or a needle.

The average particle size of the inorganic filler may be a size capable of filling defects such as cracks generated in the inorganic film, and may be, for example, 5 nm or more, preferably 10 nm or more, and further preferably 50 nm or more. Also, the average particle size of the inorganic filler may be, for example, 500 nm or less, preferably 450 nm or less, and further preferably 400 nm or less. This is because, by setting the average particle size of the inorganic filler within the above range, defects generated in the inorganic film may be filled, and a maze effect may be exhibited. Incidentally, the maze effect refers to a condition wherein water vapor or oxygen is inhibited by the inorganic filler and hardly passes, due to dispersion of the inorganic filler.

The average particle size of the inorganic filler is a value measured by surface SEM observation, and may be an average value of particle size of five particles randomly selected. When the shape of the inorganic filler is in the form of a layer or a plate, as the inorganic layered compound described later, the maximum length of five inorganic fillers randomly selected is defined as the particle size of the inorganic filler.

Examples of the inorganic filler may include silica, talc, alumina, mica, calcium carbonate, magnesium carbonate, barium sulfate, and an inorganic layered compound. Among them, the inorganic filler may be an inorganic layered compound.

The inorganic layered compound refers to an inorganic compound wherein unit crystal layers are stacked to form one layered particle. Examples of the inorganic layered compound may include a clay mineral, and specifically, may include following clay minerals, substitution products or derivatives of these: phyllosilicate minerals such as hydrous silicate; kaolinite group clay minerals such as halloysite, kaolinite, endellite, dickite, and nacrite; antigorite group clay minerals such as antigorite, and chrysotile; smectite group clay minerals such as montmorillonite, iron montmorillonite, beidellite, nontronite, saponite, hectorite, sauconite, and stevensite; vermiculite group clay minerals such as vermiculite; mica such as muscovite and phlogopite; mica or mica group clay minerals such as margarite, tetrasilicic mica, and taeniolite; chlorite group such as cookeite, sudoite, clino chlore, chamosite, and nimite. These clay minerals may be natural clay minerals or synthetic clay minerals. The inorganic layered compound may be used alone or in combination of two or more kinds thereof.

Among the clay minerals described above, the inorganic layered compound may be a clay mineral including at least one selected from the group consisting of Na, Mg, Fe, and Ca.

The filler-containing overcoating layer includes a resin, in addition to the inorganic filler. Examples of the resin may include resins generally used for the overcoating layer, and examples thereof may include water-soluble resins. Among them, a water-soluble resin having high gas barrier property may be used. Specific examples of the resin may include polyvinyl alcohol (PVA), polyvinylidene chloride (PVDC), ethylene-vinyl alcohol copolymer (EVOH), polyacrylonitrile (PAN), nylon, polyester, polyamide, polysaccharide, polyacrylic acid and esters thereof. These may be used alone, or two or more kinds of them may be used in combination.

In addition to the inorganic filler and the resin, the filler-containing overcoating layer may include a known additive, according to the needs.

The ratio of the solid mass of the inorganic filler with respect to the solid mass of the resin in the filler-containing overcoating layer may be 50 mass % or less, and among them, 45 mass % or less, particularly preferably 40 mass % or less, and the ratio may be 5 mass % or more, and is preferably 10 mass % or more. This is because, by setting the ratio of the solid mass of the inorganic filler in the filler-containing overcoating layer within the above range, sufficient gas barrier property may be exhibited, and the surface of the filler-containing overcoating layer may be made uniform.

The filler-containing overcoating layer may be formed, for example, by coating the surface of the inorganic film of the gas barrier film with an aqueous solution of a composition wherein an inorganic filler and a resin are dissolved and dispersed in a solvent, and drying. When the inorganic layered compound is used as the inorganic filler, it may be swollen in a dispersion medium of, for example, water in advance, if necessary.

(c) Resin Base Material

Similar to the gas barrier film in the first embodiment, the gas barrier film in the present embodiment may include a resin base material. Examples of the resin base material may include those similar to ones described in "A. Outer packing material for vacuum insulation material, I. First embodiment, 1. Gas barrier film, (b) Resin base material" above.

In the present embodiment, the gas barrier film usually includes the resin base material, the inorganic film, and the overcoating layer in this order. One or more of the outer gas barrier film is preferably placed in a direction so that the overcoating layer is on the oxygen barrier resin layer side than the resin base material. Particularly, the inorganic film of the outer gas barrier film closest to the resin layer is preferably placed facing to the resin layer, via the overcoating layer (not via the resin base material).

When the outer packing material for vacuum insulation material includes a plurality of gas barrier films, the inorganic film, the resin base material, and overcoating layer may be respectively the same, and may be different.

2. Oxygen Barrier Resin Layer

The outer packing material for vacuum insulation material in the present embodiment includes an oxygen barrier resin layer. The EVOH and PVA included in the oxygen barrier resin layer are hydrophilic resins including a hydrophilic group, and exhibit high barrier property to oxygen.

Examples of the oxygen barrier resin layer may include those similar to ones described in "A. Outer packing material for vacuum insulation material, I. First embodiment, 2. Oxygen barrier resin layer" above.

3. Thermally Weldable Film

The outer packing material for vacuum insulation material in the present embodiment includes the thermally weldable layer on one main surface side. Examples of the thermally weldable film may include those similar to ones described in "A. Outer packing material for vacuum insulation material, I. First embodiment, 3. Thermally weldable film".

4. Arbitrary Constitutions

Similar to the outer packing material for vacuum insulation material in the first embodiment, the outer packing material for vacuum insulation material in the present embodiment may include an adhesive layer. Examples of these may include those similar to ones described in "A. Outer packing material for vacuum insulation material, I. First embodiment, 5. Arbitrary constitutions".

5. Properties

The outer packing material for vacuum insulation material in the present embodiment has an excellent gas barrier property. The gas barrier property means an oxygen barrier property specified by an oxygen permeability, and a water vapor barrier property specified by a water vapor permeability.

Specifically, it may be similar to the gas barrier property similar to one described in "A. Outer packing material for vacuum insulation material, I. First embodiment, 4. Properties" above.

Particularly, the water vapor permeability may be 0.03 g/(m²·day) or less, and above all, may be 0.01 (m²·day) or less.

V. Outer Packing Material for Vacuum Insulation Material

Since a metal layer is not placed in all of the outer packing materials for vacuum insulation material in the present disclosure described in the first embodiment, second embodiment, third embodiment, and the fourth embodiment, it has radiowave transmittance. Here, having radiowave transmittance is not particularly limited as long as it has radiowave transmittance to an extent that a device in a compartment surrounded by the vacuum insulation material is able to be in contact via radiowave, with outside thereof; and the electromagnetic wave shielding property within a range of 300 MHz to 30 GHz is preferably, for example, 10 dB or less. The radiowave transparency may be measured by a far-field measurement. Specifically, the radiowave transparency may be evaluated by placing a transmission antenna in one radiowave darkroom and a reception antenna in another radiowave darkroom, and placing a shielding material on the partition wall separating these two darkrooms.

The outer packing material for vacuum insulation material in the present disclosure may and may not have transparency, and may be appropriately set according to the use application of the vacuum insulation material wherein the outer packing material for vacuum insulation material in the present disclosure is used. The transparency of the outer packing material for vacuum insulation material is not specified with a strict transmittance, and may be appropriately determined according to the use application. When the outer packing material for vacuum insulation material in the present disclosure is transparent, inside of the vacuum insulation material using the outer packing material for vacuum insulation material is visible. Therefore, by installing a detecting agent inside the vacuum insulation material, together with the core material, the vacuum condition of the inside may be confirmed visibly, from the change in the detecting agent.

Examples of the method for producing the outer packing material for vacuum insulation material in the present disclosure may include a method wherein each film produced in advance is pasted via an adhesive layer described above. Also, the outer packing material for vacuum insulation material in the present disclosure may be produced by extruding the thermally melted raw material of each film, by a tool such as a T-die sequentially to stack thereof.

The outer packing material for vacuum insulation material in the present disclosure may be used for a vacuum insulation material. The outer packing material for vacuum insulation material in the present disclosure may be used in the manner placed in a vacuum insulation material so as the thermally weldable films come to the core material side and to face each other interposing the core material.

B. Vacuum Insulation Material

The vacuum insulation material in the present disclosure is a vacuum insulation material characterized by comprising:

a core material, and an outer packing material enclosing the core material; wherein the outer packing material is the one explained in the section "A. Outer packing material for vacuum insulation material" above.

Figure 5A:
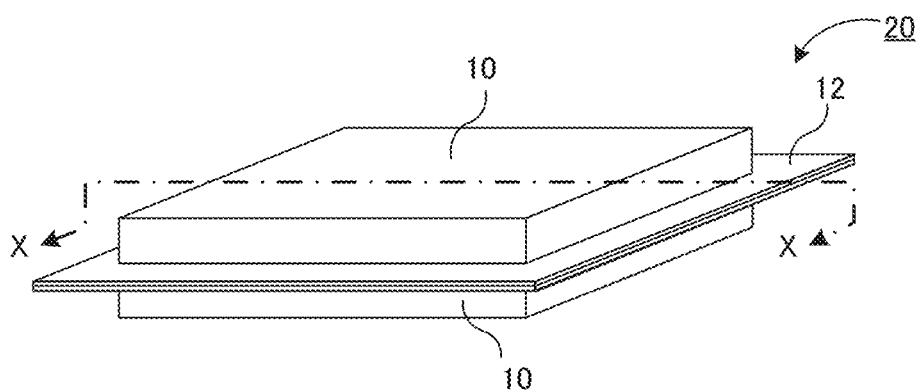
FIGS. 5A and 5B are a schematic perspective vies and a schematic cross-sectional view illustrating an example of the vacuum insulation material in the present disclosure.
Figure 5B:
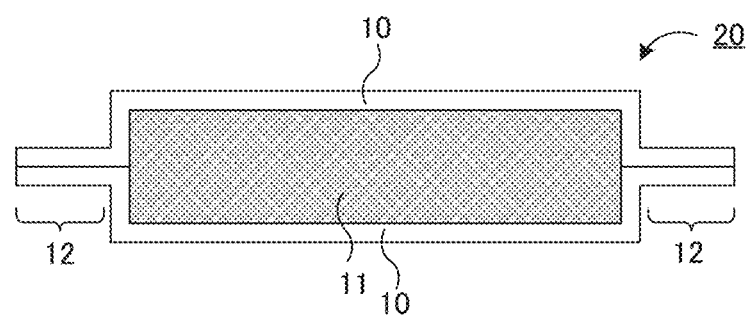

FIG. 5A is a schematic perspective view illustrating an example of the vacuum insulation material in the present disclosure, and FIG. 5B is an X-X cross-sectional view of FIG. 5A. Vacuum insulation material 20 illustrated in FIGS. 5A and 5B comprises core material 11, and outer packing material 10 enclosing the core material 11, and outer packing material 10 is the outer packing material for vacuum insulation material explained in FIG. 1. The vacuum insulation material 20 is formed by two pieces of the outer packing material 10 in the manner that the two pieces of the outer packing material 10 are brought into a form wherein each of the thermally weldable film faces to each other, edges 12 are thermally welded to prepare a bag body wherein the core material 11 is enclosed inside the bag body, and the pressure inside the bag body is decompressed.

According to the present disclosure, since the outer packing material enclosing the core material is the outer packing material for vacuum insulation material explained in the section "A. Outer packing material for vacuum insulation material" above, the vacuum insulation material having radiowave transmittance is able to maintain good thermal insulation property.

Hereinafter, each constitution of the vacuum insulation material in the present disclosure is explained.

1. Outer Packing Material for Vacuum Insulation Material

The outer packing material for vacuum insulation material in the present disclosure is a member enclosing the core material, and is similar to the outer packing material for vacuum insulation material explained in the section "A. Outer packing material for vacuum insulation material" above; thus, the explanation herein is omitted.

2. Core Material

The core material in the present disclosure is a member that is enclosed by the outer packing material for vacuum insulation material. Incidentally, to be enclosed means to be sealed inside the bag body formed of the outer packing materials for vacuum insulation material.

The core material preferably has low heat conductivity. Also, the core material may be a porous material of which void ratio is 50% or more, and particularly 90% or more.

As the material configuring the core material, a material such as a powder body, a foam body, and a fiber body may be used. The powder body may be inorganic and may be organic; for example, a material such as dry silica, wet silica, condensed silica powder, a conductive powder body, a calcium carbonate powder, perlite, cray, and talc may be used. Above all, the mixture of dry silica and a conductive powder body is advantageous on the occasion of using thereof in the temperature range where inner pressure rise is caused, since the degrade of the thermal insulation property along with the inner pressure rise of the vacuum insulation material is small. Further, addition of a material having small infrared ray absorption rate such as a titanium oxide, an aluminum oxide, and indium-doped tin oxide to the above described material as a radiation inhibitor may reduce the infrared ray absorption rate of the core material.

As the foam body, a material such as urethane foam, styrene foam, and phenol foam may be used. Above all, a foam body forming continuous foam is preferable.

The fiber body may be inorganic fiber and may be organic fiber, and inorganic fiber is preferably used from the viewpoint of thermal insulation property. Examples of the inorganic fiber may include glass fiber such as glass wool and glass fiber, alumina fiber, silica alumina fiber, silica fiber, ceramic fiber, and rock wool. These inorganic fibers are preferable on the point that they have low heat conductivity and are more easily handled compared to powder bodies.

As the core material, the above described material may be used singly, and two kinds or more of the materials may be mixed to form a composite material.

3. Others

In the vacuum insulation material in the present disclosure, the core material is enclosed inside the outer packing material for vacuum insulation material, and the inside is decompressed to be a vacuum state. The vacuum degree inside the vacuum insulation material is, for example, preferably 5 Pa or less. The reason therefor is to lower the heat conduction due to the convection of air remained inside so as to achieve excellent thermal insulation property.

The lower the heat conductivity of the vacuum insulation material, the more preferable. The heat conductivity (initial heat conductivity) is, for example, preferably 5 mW/(mK) or less. The reason therefor is that the vacuum insulation material would not easily conduct heat to outside, and thus high heat insulation effect may be achieved. Above all, the initial heat conductivity is more preferably 4 mW/(mK) or less. The heat conductivity may be a value measured in accordance with JIS A1412-2:1999 in the conditions of high temperature side at 30° C., low temperature side at 10° C., and average temperature at 20° C.

Also, since the outer packing material for vacuum insulation material described above is used for the vacuum insulation material in the present disclosure, the deterioration of thermal insulation property is suppressed.

As the method for producing the vacuum insulation material in the present disclosure, a general method may be used. For example, two pieces of the outer packing material for vacuum insulation material described in the section "A. Outer packing material for vacuum insulation material" above are prepared and overlapped so that each thermally weldable film faces to each other, and three sides of the outer periphery are thermally welded to obtain a bag body of with one opening side. After inserting a core material to the bag body from the opening, the air is sucked from the opening and the opening is sealed with inside of the bag body in a decompressed state; thereby, a vacuum insulation material may be obtained.

The vacuum insulation material in the present disclosure may be used in, for example, an article that requires thermal insulation and radiowave transmittance. The article is described later.

C. Article Provided with Vacuum Insulation Material

The article provided with vacuum insulation material in the present disclosure is an article provided with vacuum insulation material characterized by comprising: an article including a thermal insulation region, and a vacuum insulation material; wherein the vacuum insulation material includes a core material, and an outer packing material enclosing the core material; and the outer packing material is the outer packing material for vacuum insulation material explained in the section "A. Outer packing material for vacuum insulation material" above.

According to the present disclosure, since the vacuum insulation material used in the article is configured with the outer packing material explained in the section "A. Outer packing material for vacuum insulation material", the vacuum insulation material is capable of exhibiting excellent thermal insulation property for a long period of time; thus, energy conservation of an article and of a target material wherein the article is used, in high temperature and high humidity environment may be achieved by the article including such vacuum insulation material. Also, since the vacuum insulation material is capable of transmitting radiowave, discrimination of the contents of the article is possible, and the contents of the article will be traceable.

The vacuum insulation material and the outer packing material for vacuum insulation material used for the same in the present disclosure are explained in detail in the section "B. Vacuum insulation material" and "A. Outer packing material for vacuum insulation material" above; thus, the explanation herein is omitted.

The article in the present disclosure includes a thermal insulation region. Here, the thermal insulation region is a region thermally insulated by the vacuum insulation material, which is, for example, a region warmed or cooled, a region surrounding a heating source and a cooling source, and a region isolated from the heating source and the cooling source. These regions may be a space and may be a substance. Also, the article is preferably an article requiring radiowave transmittance.

Examples of the article may include electronic devices such as a refrigerator, a freezer, a heat-keeping device, and a cool-keeping device; containers such as a heat-keeping container, a cool-keeping container, a container for transportation, a container, and a storing container; conveyance for transporting such as a vehicle, an airplane, and a vessel; buildings such as a house and a storehouse; and construction materials such as a wall material and a floor material.

The present disclosure is not limited to the above embodiment. The foregoing embodiments are merely exemplifications and any other variations having substantially the same constitutions as the technical idea described in the claims of the present disclosure and the same operations and effects thereto are intended to be included within the scope of the present disclosure.

EXAMPLES

The present disclosure is hereinafter explained in further details with reference to Examples and Comparative Examples.
[Materials]
Members and adhesives constituting the outer packing material for vacuum insulation material in Examples and Comparative Examples are shown below and in Table 1.
(Gas Barrier Film)
  Gas barrier film A: a film (IB-PET-PXB, from Dai Nippon Printing Co., Ltd.) wherein the following overcoating layer A is provided on an alumina vapor deposition film deposited on one side of a PET film (thickness: 12 μm)
  Gas barrier film B: a film (IB-PET-UB, from Dai Nippon Printing Co., Ltd.) wherein the following overcoating layer A is provided on a silica vapor deposition film deposited on one side of a PET film (thickness: 12 μm)
  Gas barrier film C: a film wherein the following overcoating layer A is provided on a silica vapor deposition film deposited on one side of a PET film (thickness: 12 μm, TECHBARRIER™ LX from Unitika Ltd.)
  Gas barrier film D: a film wherein the following overcoating layer A is provided on an alumina vapor deposition film deposited on one side of a plasma treated PET film (thickness: 12 μm) treated with a hollow cathode plasma source
  Gas barrier film E: a vapor deposition film of a film wherein an alumina is vapor deposited on one side of a plasma treated PET film (thickness: 12 μm) treated with a hollow cathode plasma source
  Gas barrier film F: a vapor deposition film of a film wherein an alumina is vapor deposited on one side of a PET film (thickness: 12 μm)
(EVOH Containing Gas Barrier Film)
  Gas barrier film G: an ethylene-vinyl alcohol copolymer (EVOH) film (EF-F from Kuraray Co., Ltd., thickness: 12 μm)
  Gas barrier film H: a film (VM-XL from Kuraray Co., Ltd., thickness: 12 μm) wherein metal aluminum (Al) film is vapor deposited on one side of an ethylene-vinyl alcohol copolymer (EVOH) film.
(Overcoating Layer)
Overcoating Layer A
  Solution B (a hydrolyzed solution comprising tetraethoxy silane (TEOS), isopropyl alcohol, hydrochloric acid, and ion exchanged water) prepared in advanced in accordance with the composition shown below was added to solution A (a mixture solution comprising polyvinyl alcohol, isopropyl alcohol, and water) prepared in accordance with the composition shown below, and stirred to obtain a colorless and transparent composition for overcoating layer by a sol-gel method.

The composition for overcoating layer was coated on the gas barrier film which is an object to be coated, using a gravure coating method, and then, the product was heat-treated respectively at 120° C., 140° C., and 150° C. for 20 seconds each to form a overcoating layer having the required thickness, and aged at 55° C. for one week to obtain an overcoating layer A that was a mixture compound layer containing a silicon element, an oxygen element, and a polyvinyl alcohol resin.
<Composition of Composition for Overcoating Layer>
(Solution A)
  Polyvinyl alcohol: 1.81 mass,
  Isopropyl alcohol: 39.80 mass %
  Water: 2.09 mass,
(Solution B)
  Tetraethoxysilane: 21.49 mass %
  Isopropyl alcohol: 5.03 mass %
  0.5N hydrochloric acid solution: 0.69 mass,
  Ion exchanged water: 29.10 mass %
  (*Solution A and solution B were added to be 100 mass %)
(Member: Thermally Weldable Film)
  Thermally weldable film A: straight chain low-density polyethylene film (trade name: TUX HC-E from Mitsui Chemicals Tohcello, Inc., thickness of 50 μm)
(Adhesive)
  Adhesive A: two-liquid curing type adhesive wherein a main agent mainly composed of polyester polyol (product name: RU-77T, from ROCK PAINT CO., LTD), a curing agent including aliphatic based isocyanate (product name: H-7 from ROCK PAINT CO., LTD), and a solvent of ethyl acetate were mixed in the weight blending ratio of the main agent:the curing agent:the solvent=10:1:14.
(Production of Outer Packing Material for Vacuum Insulation Material)

Example 1

An outer packing material for vacuum insulation material including the gas barrier film A as the first layer, the gas barrier film A as the second layer, the gas barrier film G as the third layer, and the thermally weldable film A as the fourth layer in this order, was obtained. The gas barrier film A of the first layer was placed so that the overcoating layer was on the side of the gas barrier film A of the second layer.

The gas barrier film A of the second layer was placed so that the overcoating layer was on the side of the gas barrier film G of the third layer.

As for between the layers, the adhesive A was pasted on the adherend surface of one member in the pasting amount of 3 g/m² to form an adhesive layer, another member was placed on the adhesive layer, and pressurized to adhere.

That is, in Example 1, an outer packing material for vacuum insulation material having a layered structure wherein the gas barrier film A (PET film/alumina vapor deposition film/overcoating layer)/the gas barrier film A (PET film/alumina vapor deposition film/overcoating layer)/the gas barrier film G (EVOH film)/the thermally weldable film (LLDPE film) stacked in this order, was obtained.

Example 2

An outer packing material for vacuum insulation material including the gas barrier film C as the first layer, the gas barrier film C as the second layer, the gas barrier film G as the third layer, and the thermally weldable film A as the fourth layer in this order, was obtained. The gas barrier film C of the first layer was placed so that the overcoating layer was on the side of the gas barrier film C of the second layer. The gas barrier film C of the second layer was placed so that the overcoating layer was on the side of the gas barrier film G of the third layer. Between respective layers were adhered in the same manner as in Example 1.

That is, in Example 2, an outer packing material for vacuum insulation material having a layered structure wherein the gas barrier film C (PET film/silica vapor deposition film/overcoating layer)/the gas barrier film C (PET film/silica vapor deposition film/overcoating layer)/the gas barrier film G (EVOH film)/the thermally weldable film (LLDPE film) stacked in this order, was obtained.

Example 3

An outer packing material for vacuum insulation material including the gas barrier film D as the first layer, the gas barrier film D as the second layer, the gas barrier film G as the third layer, and the thermally weldable film A as the fourth layer in this order, was obtained. The gas barrier film D of the first layer was placed so that the overcoating layer was on the side of the gas barrier film D of the second layer. The gas barrier film D of the second layer was placed so that the overcoating layer was on the side of the gas barrier film G of the third layer. Between respective layers were adhered in the same manner as in Example 1.

That is, in Example 3, an outer packing material for vacuum insulation material having a layered structure wherein the gas barrier film D (PET film/alumina vapor deposition film/overcoating layer)/the gas barrier film D (PET film/alumina vapor deposition film/overcoating layer)/the gas barrier film G (EVOH film)/the thermally weldable film (LLDPE film) stacked in this order, was obtained.

Example 4

An outer packing material for vacuum insulation material including the gas barrier film A as the first layer, the gas barrier film B as the second layer, the gas barrier film G as the third layer, and the thermally weldable film A as the fourth layer in this order, was obtained. The gas barrier film A of the first layer was placed so that the overcoating layer was on the side of the gas barrier film B of the second layer. The gas barrier film B of the second layer was placed so that the overcoating layer was on the side of the gas barrier film G of the third layer. Between respective layers were adhered in the same manner as in Example 1.

That is, in Example 4, an outer packing material for vacuum insulation material having a layered structure wherein the gas barrier film A (PET film/alumina vapor deposition film/overcoating layer)/the gas barrier film B (PET film/silica vapor deposition film/overcoating layer)/the gas barrier film G (EVOH film)/the thermally weldable film (LLDPE film) stacked in this order, was obtained.

Example 5

An outer packing material for vacuum insulation material including the gas barrier film E as the first layer, the gas barrier film E as the second layer, the gas barrier film G as the third layer, and the thermally weldable film A as the fourth layer in this order, was obtained. The gas barrier film E of the first layer was placed so that the alumina vapor deposition film was on the side of the gas barrier film E of the second layer. The gas barrier film E of the second layer was placed so that the alumina vapor deposition film was on the side of the gas barrier film G of the third layer. Between respective layers were adhered in the same manner as in Example 1.

That is, in Example 5, an outer packing material for vacuum insulation material having a layered structure wherein the gas barrier film E (PET film/alumina vapor deposition film)/the gas barrier film E (PET film/alumina vapor deposition film)/the gas barrier film G (EVOH film)/the thermally weldable film (LLDPE film) stacked in this order, was obtained.

Comparative Example 1

An outer packing material for vacuum insulation material including the gas barrier film F as the first layer, the gas barrier film F as the second layer, the gas barrier film H as the third layer, and the thermally weldable film A as the fourth layer in this order, was obtained. The gas barrier film F of the first layer was placed so that the alumina vapor deposition film was on the side of the gas barrier film F of the second layer. The gas barrier film F of the second layer was placed so that the alumina vapor deposition film was on the side of the gas barrier film H of the third layer. The gas barrier film H of the third layer was placed so that the alumina vapor deposition film was on the side of the gas barrier film F of the second layer. Between respective layers were adhered in the same manner as in Example 1.

That is, in Comparative Example 1, an outer packing material for vacuum insulation material having a layered structure wherein the gas barrier film F (PET film/alumina vapor deposition film)/the gas barrier film F (PET film/alumina vapor deposition film)/the gas barrier film H (alumina vapor deposition film/EVOH film)/the thermally weldable film (LLDPE film) stacked in this order, was obtained.

Comparative Example 2

An outer packing material for vacuum insulation material including the gas barrier film A as the first layer, the gas barrier film A as the second layer, the gas barrier film A as the third layer, and the thermally weldable film A as the fourth layer in this order, was obtained. The gas barrier film A of the first layer was placed so that the overcoating layer was on the side of the gas barrier film A of the second layer. The gas barrier film A of the second layer was placed so that the overcoating layer was on the side of the gas barrier film A of the third layer. The gas barrier film A of the third layer was placed so that the overcoating layer was on the side of the gas barrier film A of the second layer. Between respective layers were adhered in the same manner as in Example 1.

That is, in Comparative Example 2, an outer packing material for vacuum insulation material having a layered structure wherein the gas barrier film A (PET film/alumina vapor deposition film/overcoating layer)/the gas barrier film A (PET film/alumina vapor deposition film/overcoating layer)/the gas barrier film A (overcoating layer/alumina vapor deposition film/PET film)/the thermally weldable film (LLDPE film) stacked in this order, was obtained.

TABLE 1

| | Gas barrier film | | | 4th layer Thermally weldable film | Resin layer | Metal layer | Overcoating layer |
|---|---|---|---|---|---|---|---|
| | 1st layer | 2nd layer | 3rd layer | | | | |
| Ex. 1 | Gas barrier film A | Gas barrier film A | Gas barrier film G | Thermally weldable film A | Yes | No | Yes |
| Ex. 2 | Gas barrier film C | Gas barrier film C | Gas barrier film G | Thermally weldable film A | Yes | No | Yes |
| Ex. 3 | Gas barrier film D | Gas barrier film D | Gas barrier film G | Thermally weldable film A | Yes | No | Yes |
| Ex. 4 | Gas barrier film A | Gas barrier film B | Gas barrier film G | Thermally weldable film A | Yes | No | Yes |
| Ex. 5 | Gas barrier film E | Gas barrier film E | Gas barrier film G | Thermally weldable film A | Yes | No | No |
| Comp. Ex. 1 | Gas barrier film F | Gas barrier film F | Gas barrier film H | Thermally weldable film A | Yes | Yes | No |
| Comp. Ex. 2 | Gas barrier film A | Gas barrier film A | Gas barrier film A | Thermally weldable film A | No | No | Yes |

(Water Vapor Permeability)

Regarding each of the outer packing material for vacuum insulation material obtained in Examples 1 to 5 and Comparative Examples 1 to 2, a sample was cut out, and the oxygen permeability was measured according to the method explained in the section "A. Outer packing material for vacuum insulation material I. First embodiment, 4. Properties" above under the conditions of temperature of 40° C. and relative humidity difference of 90% RH. The results are shown in Table 2.

(Production of Vacuum Insulation Material)

Two pieces of the outer packing material for vacuum insulation material (size: 360 mm×450 mm) obtained in Examples 1 to 5 and Comparative Examples 1 to 2 were prepared and overlapped so that each of the thermally weldable film faces to each other, and the three sides of tetragon were heat-sealed to form a bag body of with just one opening side. Glass wool in the size of 300 mm×300 mm×30 mm was used as a core material, and a drying treatment was carried out thereto, and after that, the core material and 10 g of a drying agent (calcium oxide) were stored in the bag body, and the air inside the bag body was ejected. After that, the opening part of the bag body was sealed by heat-sealing to obtain a vacuum insulation material. The ultimate pressure was 0.05 Pa.

(Heat Conductivity of Vacuum Insulation Material)

The heat conductivity of the vacuum insulation material was measured according to the method and conditions explained in the section "B. Vacuum insulation material" above. The measurement was carried out for the vacuum insulation material after the deterioration test under atmosphere of 70° C. 90% RH for two weeks. The results are shown in Table 2.

TABLE 2

| | Water vapor permeability [g/(m² · day)] | VIP heat conductivity (70° C. 90% RH 2 weeks) | Radiwave transmittance |
|---|---|---|---|
| Example 1 | 0.005 | 6.9 | OK |
| Example 2 | 0.003 | 7.8 | OK |
| Example 3 | 0.005 | 6.5 | OK |
| Example 4 | 0.021 | 10.7 | OK |
| Example 5 | 0.026 | 11.9 | OK |
| Comp. Ex. 1 | 0.028 | 7.2 | NG |
| Comp. Ex. 2 | 0.004 | 15.9 | OK |

As shown in Table 2, the vacuum insulation materials (Examples 1 to 5) including the outer packing material for vacuum insulation material in the present disclosure had radiowave transmittance, and were able to maintain thermal insulation property for a long period of time. Meanwhile, the outer packing material for vacuum insulation material in Comparative Example 1 did not have radiowave transmittance since a metal layer was included, and the outer packing material for vacuum insulation material in Comparative Example 2 was inferior in gas barrier property since EVOH layer was not included, and the vacuum insulation material using this was not able to maintain good thermal insulation property.

REFERENCE SIGNS LIST

1 . . . thermally weldable film
2 . . . gas barrier film
3 . . . inorganic film
4 . . . oxygen barrier resin layer
5 . . . resin base material
10 . . . outer packing material for vacuum insulation material
11 . . . core material
20 . . . vacuum insulation material

The invention claimed is:

1. An outer packing material for vacuum insulation material comprising a thermally weldable film; a resin layer including at least one of an ethylene-vinyl alcohol copolymer and polyvinyl alcohol; and a gas barrier film including a resin base material, and an inorganic film placed on at least one main surface of the resin base material, wherein
the resin layer is placed between the thermally weldable film and the gas barrier film, a water vapor permeability of the outer packing material for vacuum insulation material is 0.03 g/(m²·day) or less, the gas barrier film placed on the resin layer, on an opposite side to a side wherein the thermally weldable film is placed, includes an overcoating layer placed on the inorganic film, on a main surface opposite to the resin base material, and a metal layer is not placed in the outer packing material for vacuum insulation material.

2. The outer packing material for vacuum insulation material according to claim 1, wherein all the gas barrier films included in the vacuum insulation material are placed on the resin layer, on an opposite side to a side wherein the thermally weldable film is placed.

3. The outer packing material for vacuum insulation material according to claim 1, wherein the water vapor permeability of the outer packing material for vacuum insulation material is 0.01 g/(m²·day) or less.

4. The outer packing material for vacuum insulation material according to claim 1, wherein two or more of the gas barrier films are placed on the resin layer, on an opposite side to a side wherein the thermally weldable film is placed, and among the two or more of the gas barrier films, the inorganic film of at least two gas barrier films includes alumina.

5. An outer packing material for vacuum insulation material comprising a thermally weldable film; a resin layer including at least one of an ethylene-vinyl alcohol copolymer and polyvinyl alcohol; and a gas barrier film including a resin base material, and an inorganic film placed on at least one main surface of the resin base material, wherein the resin layer is placed between the thermally weldable film and the gas barrier film, the inorganic film of the gas barrier film placed on the resin layer, on an opposite side to the thermally weldable film, includes alumina, silica, or a mixture of these, the gas barrier film placed on the resin layer, on an opposite side to a side wherein the thermally weldable film is placed, includes an overcoating layer placed on the inorganic film, on a main surface opposite to the resin base material, and a metal layer is not placed in the outer packing material for vacuum insulation material.

6. An outer packing material for vacuum insulation material comprising a thermally weldable film; a resin layer including at least one of an ethylene-vinyl alcohol copolymer and polyvinyl alcohol; and a gas barrier film including a resin base material, and an inorganic film placed on at least one main surface of the resin base material, wherein the resin layer is placed between the thermally weldable film and two or more of the gas barrier films, the gas barrier film placed on the resin layer, on an opposite side to a side wherein the thermally weldable film is placed, includes an overcoating layer placed on the inorganic film, on a main surface opposite to the resin base material, and a metal layer is not placed in the outer packing material for vacuum insulation material.

7. A vacuum insulation material comprising a core material, and an outer packing material enclosing the core material; wherein the outer packing material is the outer packing material for vacuum insulation material according to claim 1.

8. An article provided with vacuum insulation material comprising an article including a thermal insulation region, and a vacuum insulation material; wherein the vacuum insulation material includes a core material, and an outer packing material enclosing the core material; and the outer packing material is the outer packing material for vacuum insulation material according to claim 1.

* * * * *